US007917160B2

(12) United States Patent
Choe et al.

(10) Patent No.: US 7,917,160 B2
(45) Date of Patent: Mar. 29, 2011

(54) METHOD FOR AUTOMATICALLY RECOGNIZING APPROVAL NUMBER FOR ELECTRONIC COMMERCE THROUGH SMS MESSAGE IN DMB TERMINAL

(75) Inventors: Jun-Young Choe, Seoul (KR); Young-Jip Kim, Suwon-si (KR); Jeong-Sik Cho, Suwon-si (KR); Sun-Mi Kim, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 802 days.

(21) Appl. No.: 11/503,457

(22) Filed: Aug. 11, 2006

(65) Prior Publication Data
US 2007/0037591 A1 Feb. 15, 2007

(30) Foreign Application Priority Data
Aug. 12, 2005 (KR) .................. 10-2005-0074372

(51) Int. Cl.
*H04W 4/00* (2009.01)
*H04M 1/725* (2006.01)
*G06Q 30/00* (2006.01)

(52) U.S. Cl. .................. 455/466; 455/412.1; 455/412.2; 705/26

(58) Field of Classification Search .................. 455/466; 705/26, 27, 64
See application file for complete search history.

(56) References Cited

U.S. PATENT DOCUMENTS

| | | | |
|---|---|---|---|
| 6,151,507 A * | 11/2000 | Laiho et al. .................. 455/466 |
| 2004/0002350 A1* | 1/2004 | Gopinath et al. ............. 455/466 |
| 2005/0240653 A1* | 10/2005 | Anglero ........................ 709/203 |
| 2005/0250418 A1* | 11/2005 | Chen et al. ..................... 450/81 |
| 2006/0276208 A1* | 12/2006 | Jain ............................... 455/466 |
| 2007/0027775 A1* | 2/2007 | Hwang ........................... 705/26 |
| 2007/0066283 A1* | 3/2007 | Haar et al. ................. 455/412.2 |

FOREIGN PATENT DOCUMENTS
WO WO 2004/019581 * 3/2004

* cited by examiner

*Primary Examiner* — Nick Corsaro
*Assistant Examiner* — Manpreet S Matharu
(74) *Attorney, Agent, or Firm* — Cha & Reiter, LLC

(57) ABSTRACT

Disclosed is a method for automatically recognizing an approval number for performing an electronic commerce transaction through a short messaging service (SMS) message in a digital multimedia broadcasting (DMB) terminal, the method including the steps of: accessing, by the DMB terminal, a home page for electronic commerce through a web-browsable DMB service, and determining a purchase for a predetermined product; requesting, through the home page, an approval number for approving payment for the predetermined product according to purchase determination for the predetermined product; receiving an SMS message including an approval number according to the request; displaying the SMS message in an active state of the DMB service; and recognizing the approval number from the displayed SMS message.

13 Claims, 4 Drawing Sheets

METHOD FOR AUTOMATICALLY RECOGNIZING APPROVAL NUMBER FOR ELECTRONIC COMMERCE THROUGH SMS MESSAGE IN DMB TERMINAL

CLAIM OF PRIORITY

This application claims the benefit under 35 U.S.C. 119(a) of an application entitled "Method For Automatically Recognizing Approval Number For Electronic Commerce Through SMS Message In DMB Terminal," filed in the Korean Intellectual Property Office on Aug. 12, 2005 and assigned Serial No. 2005-74372, the entire contents of which are incorporated herein by reference.

BACKGROUND OF THE INVENTION

1. Field of the Invention

The present invention relates to electronic commerce in a digital multimedia broadcasting (DMB) system, and more particularly to a method for processing an approval for authorizing a payment via a short messaging service (SMS) message during an electronic commerce transaction by a DMB terminal using a browsing function.

2. Description of the Related Art

A DMB relates to a service of providing various multimedia signals, such as voice and image, to a portable receiver or a vehicle receiver according to a digital protocol. Such DMB is classified into a satellite DMB and a terrestrial DMB depending on the transmission means. The satellite DMB provides program data to DMB terminals using a satellite radio, and the terrestrial DMB provides broadcast signals utilizing sky-wave VHF channel Nos. 12 and 8.

Such DMB aims at providing not only broadcast signals but also various services, one of which is web browsing using a browser web service (BWS). The web browsing is expected to be widely used for processing a remote payment system. Generally, according to a remote payment system using a web browser, when the user searches for a product in the conventional electronic commerce using his/her own terminal and sends a purchase request for the desired product, a service provider (i.e. selling site) transmits an approval number authorizing the transaction to a user mobile terminal. Then, the user manually inputs the transmitted approval number through the his/her own terminal (such as a PC, a PDA, etc.) via wired/wireless channel to feed the approval number back to a corresponding electronic commerce site, thereby completing the purchase for the product.

If the above transaction were to occur using an SMS message, there is a characteristic in which the mobile terminal used to receive an approval number is different from the wired/wireless communication terminal. Particularly, such an SMS message can be received and checked only in a wait mode of the mobile terminal, and the conventional method requires the additional key input task by the user.

As such, the current DMB terminal is equipped so that a mobile terminal is capable of receiving an approval number through an SMS message and a wired/wireless communication terminal is capable of searching for a product and inputting the received approval number so as to complete the payment. That is, the current DMB terminal has both functions of checking if an SMS message is received and searching for a product and inputting a received approval number so as to complete the payment process. Therefore, upon receiving an approval number through an SMS message during a web browsing mode for a product search and a payment request, the DMB terminal performs a shift operation into an SMS mode in order to check and retransmit the approval number to the web browsing mode.

However, when a current web page screen based on a DMB service requiring an input of an approval number is shifted into a screen for checking the approval number in an SMS message, there is a problem in the conventional method in that the approval number transmitted through an SMS message cannot be used again for payment in the corresponding web page because of a screen shift. Therefore, a method capable of checking an approval number in an active state of a corresponding web page is desired. Moreover, even after checking an SMS message, it is necessary for the user to input a plurality of keys in order to perform payment using a DMB service. Therefore, when the conventional interface scheme is used, it may cause considerable inconvenience to users.

SUMMARY OF THE INVENTION

Accordingly, the present invention has been made to solve the above-mentioned problems occurring in the prior art and provides additional advantages, by providing a method for providing an automatic recognition of an approval number through an SMS message in a digital multimedia broadcasting (DMB) terminal, by which the DMB terminal can automatically recognize the approval number received through an SMS message and can retransmit the approval number upon electronic commerce through a browsing service, so that the DMB terminal can easily perform the remote payment.

In accordance with one aspect of the present invention, there is provided a method for enabling a user of the DMB terminal to check and input an approval number transmitted through an SMS message in a DMB mode of the DMB terminal, without interrupting the browsing service and occurrence of a screen shift, so that it is possible to easily perform the remote payment, such as micro payments using a mobile terminal.

In accordance with another aspect of the present invention, there is provided a method for automatically recognizing an approval number for electronic commerce through a short messaging service (SMS) message in a digital multimedia broadcasting (DMB) terminal, the method including the steps of: accessing, by the DMB terminal, a home page for electronic commerce through a web-browsable DMB service, and determining a purchase for a predetermined product; requesting, through the home page, an approval number for approving payment for the predetermined product according to purchase determination for the predetermined product; receiving an SMS message including an approval number according to the request; displaying the SMS message in an active state of the DMB service; and recognizing the approval number from the displayed SMS message.

In accordance with another aspect of the present invention, there is provided a method for automatically recognizing an approval number for electronic commerce through a short messaging service (SMS) message in a digital multimedia broadcasting (DMB) terminal, the method including the steps of: accessing, by the DMB terminal, a home page for electronic commerce through a web-browsable DMB service, and determining a purchase for a predetermined product; requesting, through the home page, an approval number for approving payment for the predetermined product according to purchase determination for the predetermined product; receiving an SMS message including an approval number according to the request; extracting the approval number from the displayed SMS message; and recognizing the approval number by automatically inputting the extracted approval number into an approval number input column for the payment.

In accordance with still another aspect of the present invention, there is provided a method for automatically recognizing an approval number for electronic commerce through a short messaging service (SMS) message in a digital multimedia broadcasting (DMB) terminal, the method including the steps of: accessing, by the DMB terminal, a home page for electronic commerce through a web-browsable DMB service, and determining a purchase for a predetermined product; requesting, through the home page, an approval number for approving payment for the predetermined product according to purchase determination for the predetermined product; receiving an SMS message including an approval number according to the request; converting the SMS message into data for the DMB service in an active state of the DMB service and displaying the converted data; and recognizing the approval number from the converted data displayed.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. For the purposes of clarity and simplicity, a detailed description of known functions and configurations incorporated herein will be omitted as it may obscure the subject matter of the present invention.

Figure 1:
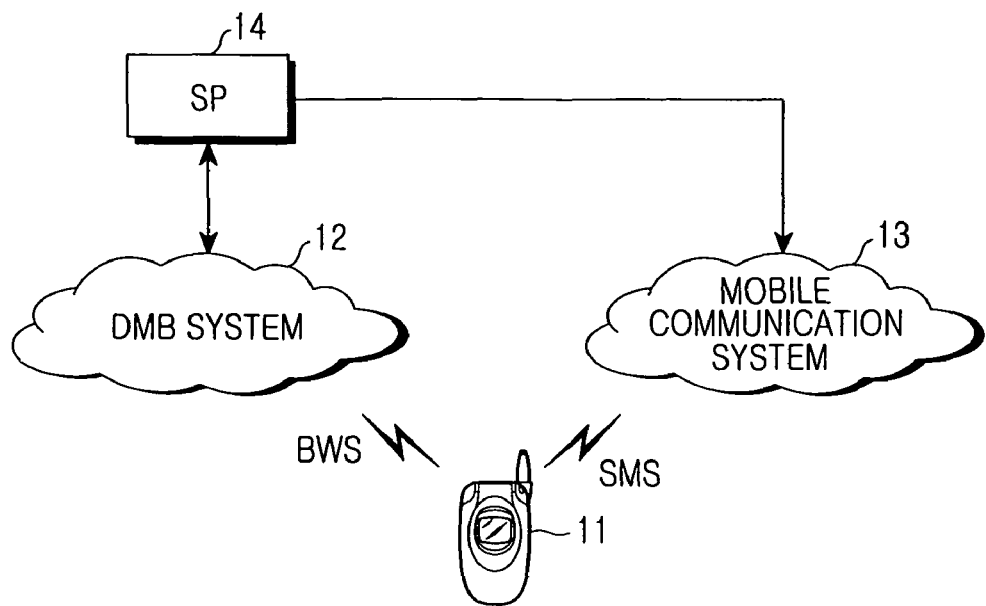
FIG. 1 is a block diagram illustrating the construction of a digital multimedia broadcasting (DMB) system to which an electronic commerce method using a DMB terminal is applied according to an embodiment of the present invention.

FIG. 1 is a block diagram illustrating the construction of a digital multimedia broadcasting (DMB) system to which an electronic commerce transaction using a DMB terminal is applied according to an embodiment of the present invention.

As shown, the DMB system according to an embodiment of the present invention includes a DMB terminal 11 in communication with a mobile communication system 13, a DMB system 12 for providing a DMB service, and a service provider (SP) 14 for providing contents to the DMB system 12 and providing an authorization number through the mobile communication system 13.

In operation, the SP 14 first provides web contents to the DMB terminal 11 through the DMB system 12. Here, the DMB system 12 and the DMB terminal 11 are in communication to each other through a browser web service (BWS). When a user finds a product he/she wants to buy while browsing the web contents, the DMB terminal 11 sends a purchase request corresponding to the desired product to the SP 14 through the DMB system 12. In response, the SP 14 transmits an approval number to the DMB terminal 11 through the mobile communication system 13, and requests the user to complete the payment by inputting the approval number.

Next, the DMB terminal 11 transmits the approval number, which has been received through a short messaging service (SMS) message from the mobile communication system 13, to the SP 14 through a BWS, thereby completing the payment.

In the electronic commerce method using a DMB terminal, as described above, it is necessary that the DMB terminal 11 checks the SMS message without ending the browser web service (BWS), so that the DMB terminal 11 can transmit the approval number, having been received through the SMS message from the mobile communication system 13, to the SP 14 through the BWS, while adhering to the security rules of electronic commerce.

Meanwhile, a screen shift must not be performed during the process of checking the SMS message. To this end, it is necessary in the DMB terminal according to an embodiment of the present invention that a communication service module for receiving an SMS message and a DMB service module for performing a DMB service cooperate with each other.

Figure 2:
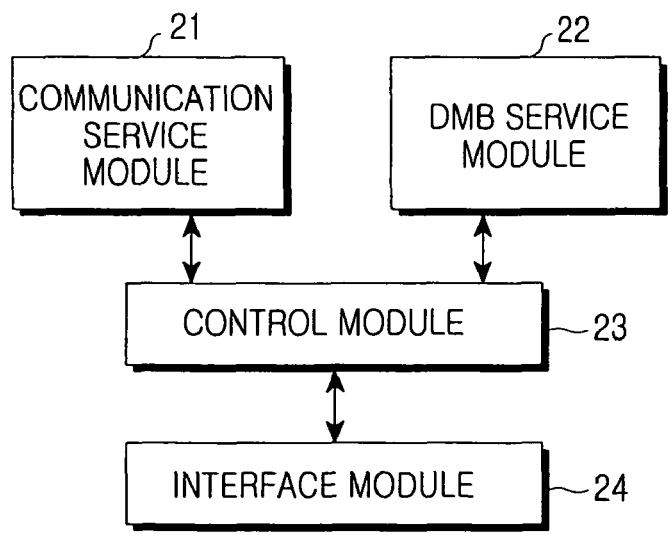
FIG. 2 is a block diagram illustrating the construction of a DMB terminal according to an embodiment of the present invention.

FIG. 2 is a block diagram illustrating the construction of a DMB terminal according to an embodiment of the present invention.

As shown, the DMB terminal 11 according to an embodiment of the present invention includes a communication module 21, a DMB service module 22, a control module 23, and an interface module 24. The communication module 21 provides a mobile communication service including the reception of SMS messages, and the DMB service module 22 provides a DMB service including a BWS service. The interface module 24 provides the communication and DMB services to the user, and also receives inputs/selections from the user. The control module 23 is connected to both the communication module 21 and the DMB service module 22, so as to transmit the outputs of the communication module 21 and DMB service module 22 to the interface module 24, and receives user's inputs through the interface module 24 so as to control the communication module 21 and DMB service module 22.

Particularly, according to an embodiment of the present invention, the control module 23 controls the communication module 21 and DMB service module 22 to cooperate with each other. In detail, the control module 23 controls the communication module 21 to be maintained in a wait state while the DMB service module 22 is being activated so that the communication module 21 can receive an SMS message, and also controls the DMB service module 22 to be maintained in an active state while a received SMS message is being checked.

To this end, when having received an SMS message through the communication module 21, while the DMB service module 22 is in an active state, the control module 23 converts the SMS message into data according to the DMB service and outputs the converted data, or controls an approval number to be automatically input into an approval number input column of the DMB service when the received SMS message corresponds to the approval number, thereby preventing the DMB service module 22 from determining that a screen shift has been performed.

Since current DMB terminals include the communication module 21 and the DMB service module 22 as separate modules, FIG. 2 shows the communication module 21 and the DMB service module 22 as separate components. However, it will be understood by those skilled in the art that the present invention can be applied even if the communication module 21 and the DMB service module 22 are integrated as a single unit in the future as the basic operations of the modules 21 and 22 are independently performed.

Figure 3:
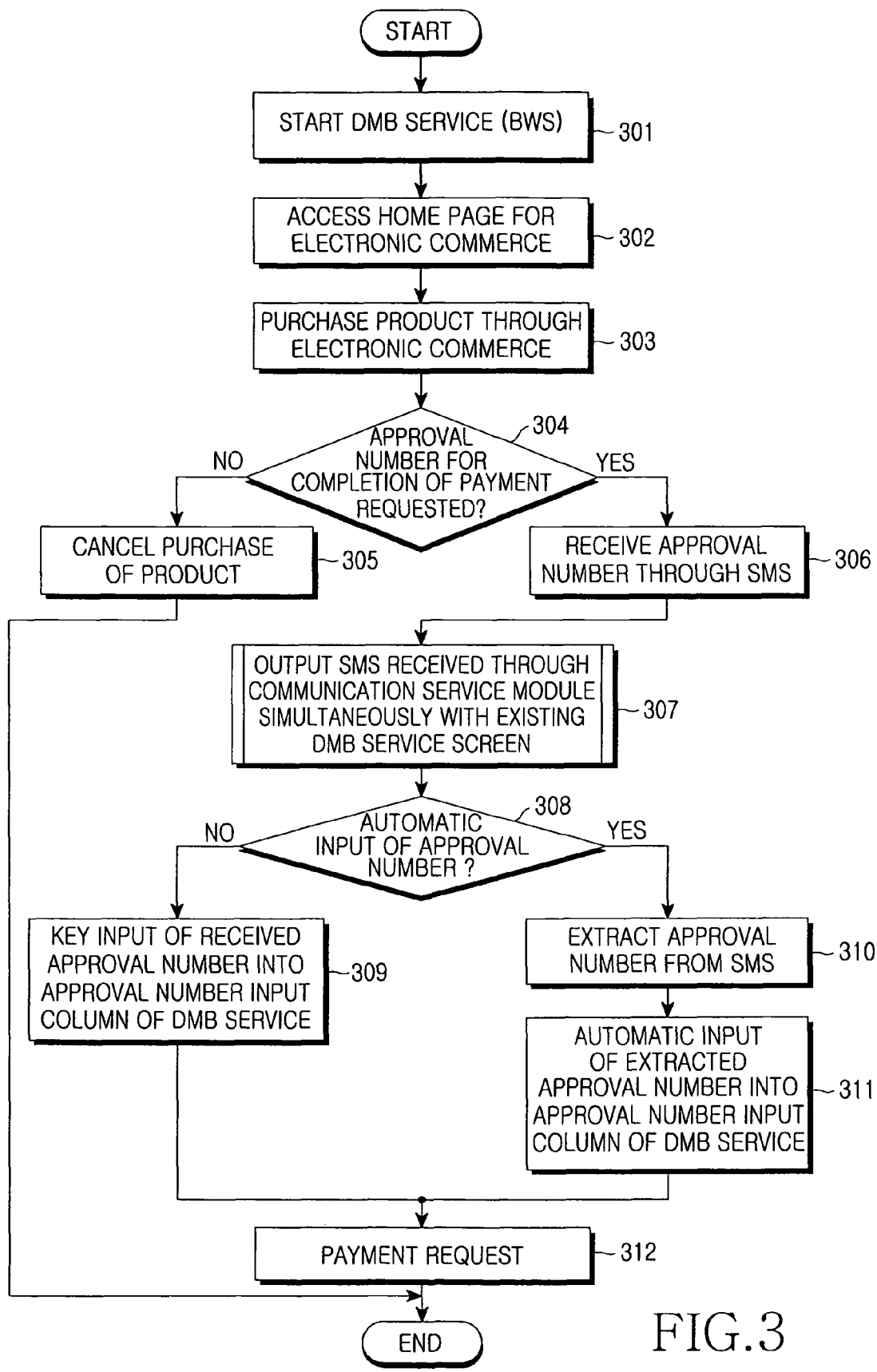
FIG. 3 is a flowchart illustrating a method for allowing a DMB terminal to automatically recognize an electronic commerce approval number transmitted through an SMS message according to an embodiment of the present invention.

FIG. 3 is a flowchart illustrating a method of allowing a DMB terminal to automatically recognize an electronic commerce approval number transmitted through an SMS message according to a first embodiment of the present invention.

According to the inventive method, the communication module 21 and the DMB service module 22, which operate independently, cooperate with each other so that an approval number can be recognized through a BWS while a DMB service is being provided.

First, the DMB terminal starts to receive a web-browsable DMB service (i.e. BWS) in step 301.

The DMB terminal accesses a home page for electronic commerce during web browsing (step 302), and attempts to buy a product that the user wants to buy by finding and selecting the product (step 303).

In step 304, in order to complete the purchase for the selected product, the DMB terminal requests a corresponding home page (i.e. service provider) to send an approval number through the DMB service. If the DMB terminal does not request an approval number for the completion of the purchase, the purchase of the product is regarded as canceled.

Figure 4A:
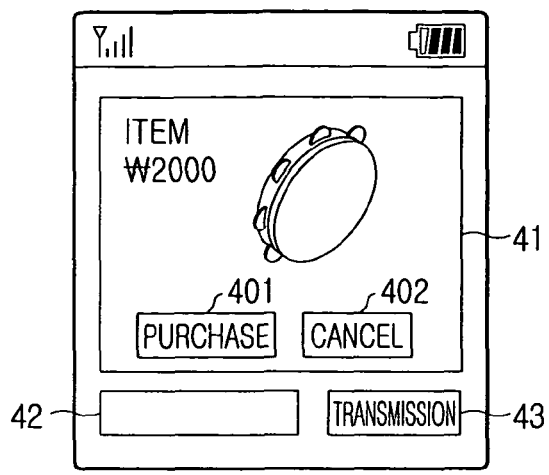
FIGS. 4A to 4C are views illustrating user interface windows for electronic commerce in the DMB terminal according to the embodiment of the present invention.
Figure 4B:
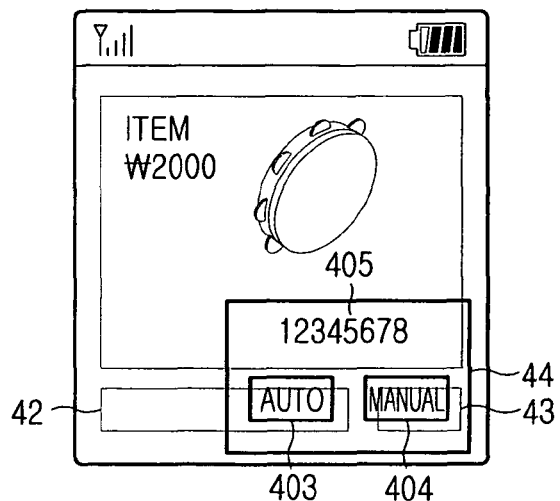
Figure 4C:
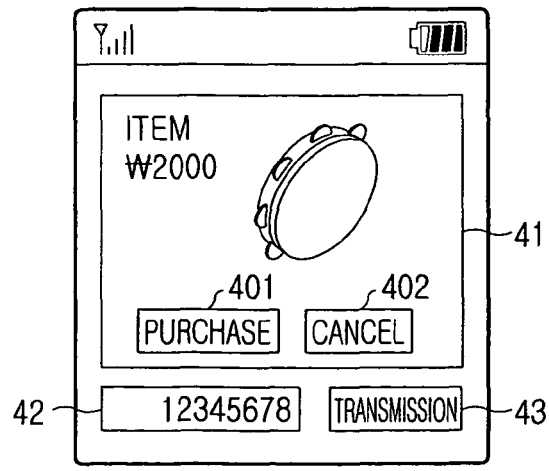

FIGS. 4A to 4C are views illustrating user interface windows for electronic commerce in the DMB terminal according to the first embodiment of the present invention.

FIG. 4A is a view illustrating an example of a purchase window for electronic commerce. That is, steps 303 and 304 are performed through the purchase window shown in FIG. 4A.

Referring to FIG. 4A, the purchase window for electronic commerce according to the first embodiment of the present invention includes a display column 41 for displaying a product to be purchased, an approval number input column 42 for effectuating the payment, and a transmission key 43 for transmitting the approval number when the approval number has been input.

Also, the display column 41 includes a purchase key 401 requesting an approval number by notifying the corresponding home page that a purchaser wants to buy a product from the home page, and a cancel key 402 for canceling a purchase. The keys 43, 401, and 402 may be displayed as shown in FIG. 4A so as to be selected by the purchaser, or they may be provided through a menu or established as specific key values on a key pad so as to perform the corresponding functions.

When the DMB terminal requests an approval number, as described above, the corresponding home page (i.e. service provider) generates an approval number by means of a random number generator or the like and transmits the generated approval number to the DMB terminal through the mobile communication system.

Then, the DMB terminal receives the approval number through an SMS message via the mobile communication system (step 306).

Next, the received approval number is output together with the DMB service screen without a screen shift (step 307). In this case, in order to simultaneously display the DMB service screen and SMS message, various display methods, such as a display method using a pop-up window, an overlay display method, a display method using a cascade scheme, etc., may be used. For simplicity, the first embodiment of the present invention will be described with reference to a display method of overlaying a pop-up window.

FIG. 4B is a view illustrating a case in which an SMS message window is overlaid on the purchase window shown in FIG. 4A. The SMS message window 44 includes an approval number such as "12345678" 405. Also, the SMS message window 44 includes an automatic key 403 and a manual key 404, which are used to select how to input the approval number. The keys 403 and 404 may be displayed as shown in FIG. 4A so as to be selected by the purchaser, or may be provided through a menu or established as the values of specific keys on a key pad so as to perform corresponding functions.

When an automatic input of the displayed approval number is selected in step 308, the approval number is extracted from message contents included in a message data field of the corresponding SMS message (step 310), and the extracted approval number is input into the approval number input column of the DMB service screen (step 311), thereby requesting the reception of payment (step 312).

In contrast, when a manual input of the displayed approval number is selected in step 308, the purchaser looks at and inputs the approval number of the displayed SMS message into the approval number input column of the DMB service screen by using the keys of the DMB terminal (step 309), thereby requesting the reception of payment (step 312).

FIG. 4C is a view illustrating a case in which the approval number has been input through the SMS message window shown in FIG. 4B. That is, it can be noted that the approval number of "12345678" 405 has been input into the approval number input column 42.

As described above, according to the method of the present invention, payment for electronic commerce is performed through the cooperation between the DMB service and the SMS service.

However, if the meaning of a screen shift in security for electronic commerce includes an SMS display window displayed in an overlay scheme, the above-mentioned method is not enough to perform the electronic commerce.

Therefore, according to a second embodiment of the present invention different from the above-mentioned embodiment of the present invention, the method of the present invention can be constructed in such a manner that an approval number is automatically extracted from a received SMS message and is directly input into the approval number input column 42, without performing step 307 of displaying the SMS message.

That is, it is possible to automatically perform steps 306 to 310. In this case, although an error may occur if a different character is input in the state of waiting to receive an approval number, it can be solved by defining a type of SMS message. Such a type of SMS message is outside the scope of the present invention, so a detailed description thereof will be omitted.

In addition, according to a third embodiment of the present invention, a similar process as that of the first embodiment of the present invention is performed, excepting that an SMS message can be converted into data of a formant to be recognizable by the DMB service and the converted data can be displayed simultaneously with a DMB service screen in step 307, instead of displaying the SMS message as it is. Accordingly, it is possible to reduce the load caused by a screen shift.

Figure 5:
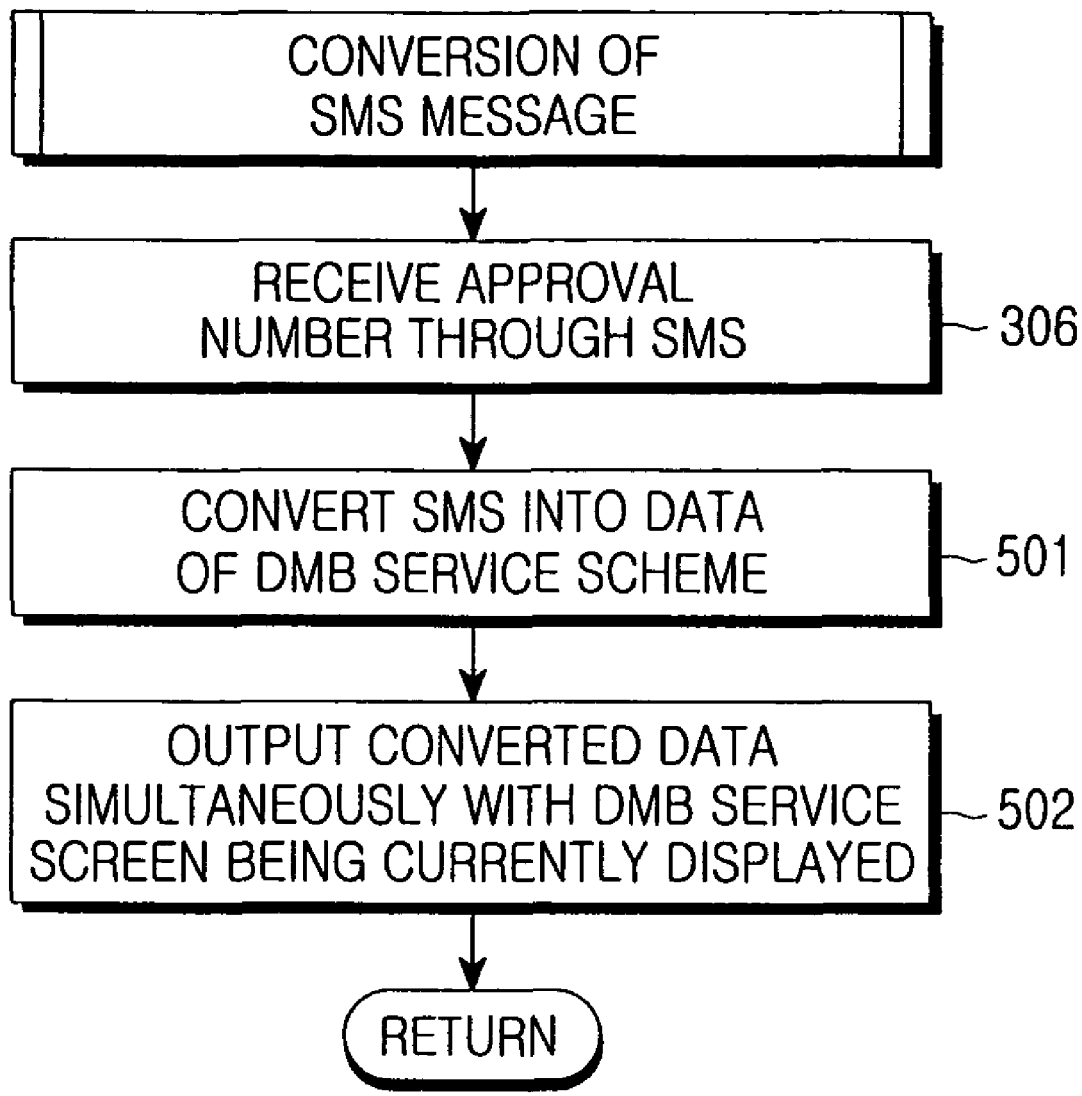
FIG. 5 is a flowchart illustrating a data conversion procedure in a method for automatically recognizing an approval number for electronic commerce through an SMS message in the DMB terminal according to another embodiment of the present invention.

FIG. 5 is a flowchart illustrating a data conversion process for automatically recognizing an approval number for electronic commerce through an SMS message in the DMB terminal according to the third embodiment of the present invention.

As shown, the DMB terminal receives an approval number through an SMS message via the mobile communication system in step 306.

Next, the DMB terminal converts the received approval number into data of a DMB service scheme (step 501). Herein, data of the DMB service scheme refers to data provided in a web page format such as HTML.

Then, the DMB terminal outputs the converted data simultaneously with a DMB service screen being currently displayed (step 502).

According to the present invention as described above, when the DMB terminal performs an electronic commerce transaction through a browsing service, the DMB terminal can automatically recognize an approval number received through an SMS message and can retransmit the approval number, so that it is possible to easily perform remote payment by the DMB terminal.

Also, according to the present invention, the user of the DMB terminal can check and input an approval number transmitted through an SMS message in a DMB mode of the DMB terminal, without interruption of the browsing service and occurrence of a screen shift, so that it is possible to easily perform a remote payment such as micro payments using a mobile terminal.

In addition, according to the present invention, the DMB terminal can automatically recognize an approval number through an SMS message and can automatically input the approval number required for micro and multiple payments using a mobile terminal, so that the required repetitive key input is reduced, thereby providing a simpler interfacing.

The method according to the present invention can be realized by a program and can be stored in a recording medium (such as a CD ROM, a RAM, a floppy disk, a hard disk, a magneto-optical disk, etc.) in a format that can be read by a computer.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for automatically recognizing an approval number for an electronic commerce transaction through a short messaging service (SMS) message in a digital multimedia broadcasting (DMB) terminal, the method comprising the steps of:
    selecting, by the DMB terminal, a desired product from a predetermined home page through a web-browsable DMB service;
    requesting, through the home page, the approval number corresponding to the desired product;
    receiving an SMS message including the approval number in response to the request;
    displaying the SMS message in an active state of the DMB service; and
    recognizing the approval number from the displayed SMS message;
    wherein the web-browsable DMB service includes a browser web service (BWS); and
    wherein the DMB terminal checks the SMS message without ending the browser web service (BWS), so that a screen shift is not performed of the predetermined home page displaying the desired product;
    wherein the recognizing step comprises the steps of:
    selecting an automatic recognition for the SMS message displayed in the displayed step;
    automatically extracting the approval number from the displayed SMS message; and
    recognizing the approval number by automatically inputting the extracted approval number into an approval number input column of the predetermined home page displaying the desired product to complete payment without requiring additional input from a user when an automatic mode in the SMS message is selected.

2. The method as claimed in claim 1, wherein the SMS message is provided through a pop-up window in the active state of the DMB service.

3. The method as claimed in claim 1, wherein the SMS message is provided in an overlay scheme in the active state of the DMB service.

4. The method as claimed in claim 1, wherein the SMS message is provided through a cascade-type display window in the active state of the DMB service.

5. The method as claimed in claim 1, wherein, upon receiving the SMS message, maintaining a display of screen of the DBM terminal without a screen shift.

6. A method for automatically recognizing an approval number relating to an electronic commerce transaction through a short messaging service (SMS) message in a digital multimedia broadcasting (DMB) terminal, the method comprising the steps of:
    selecting, by the DMB terminal, a desired product from a predetermined home page through a web-browsable DMB service;
    requesting, through the home page, the approval number for the desired product;
    receiving an SMS message including the approval number in response to the request;
    extracting the approval number from the displayed SMS message; and
    recognizing the approval number by automatically inputting the extracted approval number into an approval number input column of the predetermined home page displaying the desired product to complete payment without requiring additional input from a user when an automatic mode in the SMS message is selected;
    wherein the web-browsable DMB service includes a browser web service (BWS); and
    wherein the DMB terminal checks the SMS message without ending the browser web service (BWS), so that a screen shift is not performed of the predetermined home page displaying the desired product.

7. The method as claimed in claim 6, wherein, upon receiving the SMS message, maintaining a display of screen of the DBM terminal without a screen shift.

8. A method for automatically recognizing an approval number relating to an electronic commerce transaction through a short messaging service (SMS) message in a digital multimedia broadcasting (DMB) terminal, the method comprising the steps of:
    selecting, by the DMB terminal, a desired product from a predetermined home page through a web-browsable DMB service;
    requesting, through the home page, the approval number for the desired product;
    receiving an SMS message including the approval number according to the request;
    converting the SMS message into data for the DMB service in an active state of the DMB service and displaying the converted data; and
    recognizing the approval number from the displayed converted data;

wherein the web-browsable DMB service includes a browser web service (BWS); and wherein the DMB terminal checks the SMS message without ending the browser web service (BWS), so that a screen shift is not performed of the predetermined home page displaying the desired product;

wherein the recognizing step comprises the steps of:

selecting an automatic recognition mode for the SMS message displayed in the displayed step;

extracting the approval number from the displayed SMS message; and recognizing the approval number by automatically inputting the extracted approval number into an approval number input column.

9. The method as claimed in claim 8, wherein the converting step comprises the steps of:

converting the approval number in the received SMS message into data of a DMB service scheme; and outputting the converted data simultaneously with a DMB service screen being currently displayed.

10. The method as claimed in claim 9, wherein the data of the DMB service scheme has a web page format of an HTML scheme.

11. The method as claimed in claim 8, wherein, upon receiving the SMS message, maintaining a display of screen of the DMB terminal by not performing a screen shift.

12. A digital multimedia broadcasting (DMB) terminal for automatically recognizing an approval number relating to an electronic commerce transaction through a short messaging service (SMS) message, comprising:

a communication service module configured to receive the SMS message;

a DMB service module configured to perform a DMB Service;

a control module coupled to the communication module and the DMB service module;

an interface module coupled to the control module, wherein the control module is configured to control the communication module to maintain browser web service while the received SMS message is being checked, wherein upon receiving the SMS message, the control module is configured to control approval number is automatically input into an approval number input column of the DMB service, wherein while automatically inputting approval number into an approval number column of the DMB service, the control module is configured to prevent the DMB service module from determining that a screen shift has been performed through data conversion or control of an approval number.

13. The (DMB) terminal as claimed in claim 12, wherein the control module is configured to convert the SMS message into data according to the DMB service upon receiving the SMS message.

* * * * *